United States Patent
Havinal

(10) Patent No.: US 10,693,928 B2
(45) Date of Patent: Jun. 23, 2020

(54) METHOD AND DEVICE FOR ADAPTIVE STREAMING OF MULTIMEDIA DATA

(71) Applicant: Wipro Limited, Bangalore (IN)

(72) Inventor: Darshan Havinal, Bellary (IN)

(73) Assignee: Wipro Limited, Bangalore (IN)

( * ) Notice: Subject to any disclaimer, the term of this patent is extended or adjusted under 35 U.S.C. 154(b) by 306 days.

(21) Appl. No.: 15/456,901

(22) Filed: Mar. 13, 2017

(65) Prior Publication Data
US 2018/0219927 A1 Aug. 2, 2018

(30) Foreign Application Priority Data

Jan. 30, 2017 (IN) .............................. 201741003391

(51) Int. Cl.
| | |
|---|---|
| *H04L 29/06* | (2006.01) |
| *H04L 1/00* | (2006.01) |
| *H04L 12/26* | (2006.01) |
| *H04L 12/803* | (2013.01) |

(52) U.S. Cl.
CPC ........ *H04L 65/4092* (2013.01); *H04L 1/0017* (2013.01); *H04L 43/087* (2013.01); *H04L 43/0847* (2013.01); *H04L 43/0894* (2013.01); *H04L 47/125* (2013.01); *H04L 65/80* (2013.01); *H04L 2001/0096* (2013.01)

(58) Field of Classification Search
CPC .............. H04L 65/4092; H04L 1/0017; H04L 43/0847; H04L 43/087; H04L 43/0894; H04L 47/125; H04L 65/80; H04L 2001/0096
See application file for complete search history.

(56) References Cited

U.S. PATENT DOCUMENTS

| | | | |
|---|---|---|---|
| 8,325,601 B2 | 12/2012 | Martinez et al. | |
| 8,589,578 B2 | 11/2013 | Gopalakrishnan et al. | |
| 2005/0141559 A1* | 6/2005 | Choi ................. | H04L 29/06027 370/469 |
| 2009/0019505 A1* | 1/2009 | Gopalakrishnan .... | H04L 1/0001 725/109 |
| 2012/0150936 A1* | 6/2012 | Yoshida ........... | H04N 21/23439 709/201 |
| 2015/0006621 A1* | 1/2015 | Westphal .............. | H04L 65/605 709/203 |
| 2015/0163853 A1* | 6/2015 | In .......................... | H04W 88/06 455/73 |
| 2015/0264096 A1 | 9/2015 | Swaminathan et al. | |
| 2015/0381686 A1 | 12/2015 | Hurst | |
| 2018/0324501 A1* | 11/2018 | Kim ....................... | H04N 7/173 |

* cited by examiner

*Primary Examiner* — Wing F Chan
*Assistant Examiner* — Billy H Ng
(74) *Attorney, Agent, or Firm* — Finnegan, Henderson, Farabow, Garrett & Dunner, LLP

(57) ABSTRACT

The present disclosure discloses a method and a media device for adaptive streaming of multimedia data. The method comprises receiving, by a media device, a request for streaming a multimedia data, where the multimedia data is divided into a plurality of data packets, identifying one or more network interfaces available in the media device, allocating one or more data packets from the plurality of data packets, to the one or more network interfaces and requesting the one or more data packets of the multimedia data over the allocated one or more interfaces, for adaptively streaming the multimedia data on the media device.

18 Claims, 5 Drawing Sheets

METHOD AND DEVICE FOR ADAPTIVE STREAMING OF MULTIMEDIA DATA

This application claims the benefit of Indian Patent Application Serial No. 201741003391, filed Jan. 30, 2017, which is hereby incorporated by reference in its entirety.

FIELD

The present disclosure relates to streaming multimedia data. Particularly, but not exclusively, the present invention relates to a method and a device for streaming multimedia data over multiple network interfaces.

BACKGROUND

Streaming is a process of delivering media to an end user in a sequence. Live streaming is a process of streaming media in real-time by collecting media files from a provider. Media may be audio files or video files. Live video streaming is very popular as various media devices support downloading the media files in real-time. A video can be streamed in many qualities, for example, 144p, 240p, 360p, 480p, 720p, 1080p, etc. Here, video streaming of qualities 144p, 240p, 360p and 480p provide low picture quality and require less Internet bandwidth and low data rate for downloading the media files. Video streaming of qualities 720p, 1080p and higher resolution video streaming provide high picture quality and require high bandwidth and high data rate for downloading the media files.

In a scenario, where a user may require high quality of video streaming but has access to a poor Internet connection, traditional systems automatically decrease quality of video streaming and provide a quality of video streaming such that streaming is not interrupted. Here, video quality is compromised. Thus, the user may not get the desired quality of video streaming.

Developments are made in video streaming systems for providing the user with high quality video streaming without interruption. Conventional systems use multiple network interfaces for downloading media files for providing high quality video streaming. Here, multiple network interface may be cellular network, Wireless Fidelity (Wi-Fi) network and Bluetooth tethering. The conventional systems download the media files on each of the multiple interfaces. The media files are divided into one or more packets. Here, the one or more packets are received from at least one network interface from the multiple interfaces. However, a packet is received from each of the network interfaces, thus causing repetition of the one or more packets. Also, additional memory may be required to store the one or more packets. Thus, the conventional systems may not be feasible for applications having memory constraints. Also, device transmitting the one or more packets and device receiving the packets may consume more power for transmitting and receiving the same packets respectively.

The information disclosed in this background of the disclosure section is only for enhancement of understanding of the general background of the invention and should not be taken as an acknowledgement or any form of suggestion that this information forms the prior art already known to a person skilled in the art.

SUMMARY

In one embodiment, the present disclosure provides a method for adaptive streaming of multimedia data. The method comprises receiving, by a media device, a request for streaming a multimedia data, identifying one or more network interfaces available in the media device, allocating one or more data packets from to the one or more network interfaces, based on one or more bandwidth parameters of the one or more network interfaces and requesting the one or more data packets of the multimedia data over the allocated one or more interfaces, for adaptively streaming the multimedia data on the media device.

In one embodiment, the present disclosure provides a device for adaptive streaming of multimedia data. The device comprises a processor and a memory communicatively connected to the processor. The processor is configured to receive a request for streaming a multimedia data, identify one or more network interfaces available in the media device, allocate one or more data packets to the one or more network interfaces, based on one or more bandwidth parameters of the one or more network interfaces and request the one or more data packets of the multimedia data over the allocated one or more interfaces, for adaptively streaming the multimedia data on the media device.

In an embodiment, the present disclosure relates to a non-transitory computer readable medium including instructions stored thereon that when processed by at least one processor cause a device to perform operations comprising, receiving a request for streaming a multimedia data, wherein the multimedia data is divided into a plurality of data packets, identifying one or more network interfaces available in the media device, allocating one or more data packets from the plurality of data packets, to the one or more network interfaces, based on one or more bandwidth parameters of the one or more network interfaces and requesting the one or more data packets of the multimedia data over the allocated one or more interfaces, for adaptively streaming the multimedia data on the media device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1A:
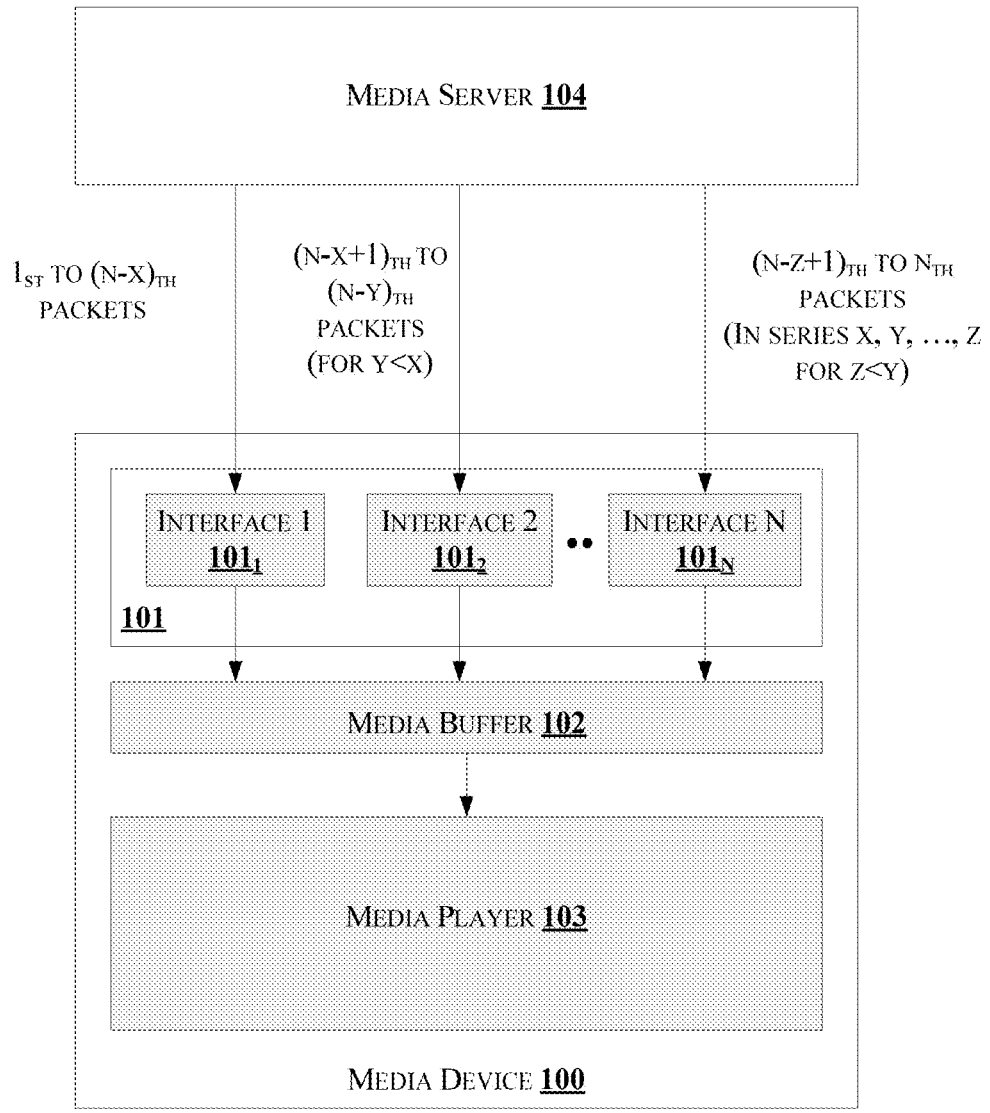
FIG. 1A shows an exemplary block diagram of a media device for adaptive streaming of multimedia data from a media server, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a device for adaptive streaming of multimedia data. The device receives a request for downloading a multimedia data. The device identifies one or more network interfaces available for downloading the multimedia data. Further, the device calculates bandwidth size and speed of each of the one or more interfaces and allocates specific packets of the multimedia to each of the one or more interfaces. Furthermore, the device requests the specific packets over the one or more interfaces. Thus, the device helps in downloading all the packets of desired quality.

FIG. 1A shows an exemplary block diagram of a media device 100 for adaptive streaming of multimedia data. FIG. 1A shows the media device 100 comprising a network interface $101_1$, a network interface $101_2$, . . . a network interface $101_N$, a media buffer 102 and a media player 103. The media device 100 is connected to a media server 104. The network interface $101_1$, a network interface $101_2$, . . . a network interface $101_N$ can be collectively represented as one or more network interfaces 101 in the present disclosure. Further, the media device 100 is connected to the media server 104. The media server 104 transmits the multimedia data as one or more packets to the media device 100. The media device 100 requests the media server 104 for the one or more packets through the one or more interfaces 101. The one or more packets received from the media server 104 are collected in the media buffer 102 of the media device 100. In an embodiment, the media buffer 102 collates the one or more packets in sequence. Further, the sequenced one or more packets are provided to the media player 103 for streaming the multimedia data.

Figure 2:
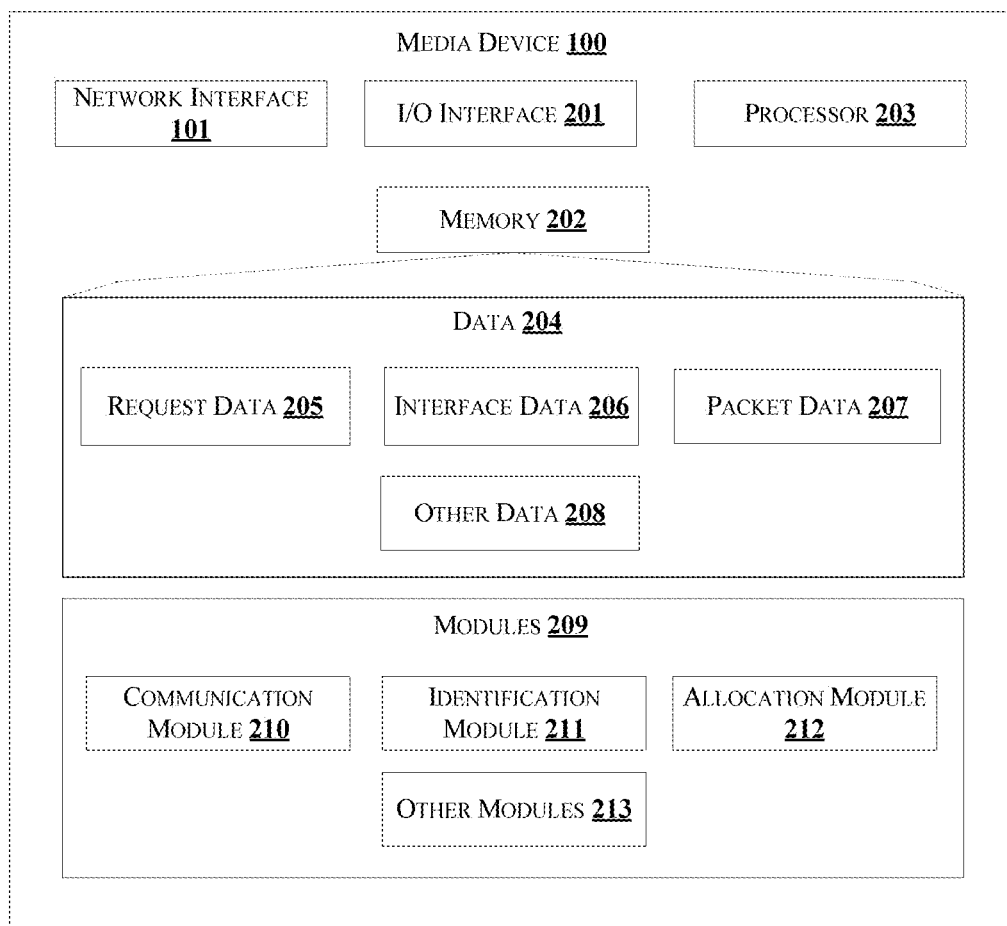
FIG. 2 shows internal architecture of a media device for adaptive streaming of multimedia data, in accordance with some embodiments of the present disclosure.

In an embodiment, let us consider a multimedia data is divided into 10 packets. Further let us consider that the media device 100 comprises three network interfaces 101. The media device 100 determines one or more bandwidth parameters of each of the one or more interfaces 101. In this illustration, the media device 100 calculates bandwidth size and bandwidth speed of each of the three network interfaces 101 and allocates specific packets from the one or more packets to each of the three network interfaces 101. The allocation of the one or more packets is illustrated in FIG. 2. Considering the 10 packets in a sequence as shown in FIG. 2, let the media device 100 allocate first packets P1 and P2 to first network interface $101_1$, subsequent 3 packets, P3, P4 and P5 to second network interface $101_2$ and packets P6, P7, P8, P9 and P10 to third network interface $101_3$. Further, the allocated packets are requested over respective one or more network interfaces 101, i.e., the packets P1 and P2 are requested over the first network interface $101_1$. Likewise, the packets P3-P5 are requested over the second network interface $101_2$ and the packets P6-P10 are requested over the third network interface $101_3$. In general, if N is the total number of packets, then the first network interface $101_1$ may be allocated $1_{st}$ packet to $(N-X)_{TH}$ packet, where X is an integer. Similarly, the second network $101_2$ may be allocated $(N-X+1)_{TH}$ packet to $(N-Y)_{TH}$ packet, where Y is an integer for Y<X. Likewise, for $N_{th}$ network interface $101_N$ may be allocated $(N-Z+1)_{TH}$ packet to $N_{TH}$ packet, where Z is an integer in a series X, Y, Z, for Z<Y.

In an embodiment, the multimedia data is divided into the one or more packets based on time frame of the multimedia data. For example, consider a multimedia data of total time frames of 120 seconds (s). Here, let each time frame be 1 s. Thus, there are 120 time frames. Let the time frames 1 s-30 s correspond to P1, time frames 30 s-40 s correspond to P2. Likewise, each packet $P_N$ represents a range of time frames K-120 s, where K represents a time frame between 1 s and 120 s.

In an embodiment, the one or more network interface 101 may include, but is not limited to cellular network, Wireless fidelity (Wi-Fi) and Bluetooth tethering. In an embodiment, the media device 100 may include but is not limited to a Personal Digital Assistant (PDA), laptop, cellular phone, tablet and any other computing device comprising plurality of network interfaces 101.

In an embodiment, the media device 100 may receive the one or more packets from the media server 104 either through wired interface or wireless interface. In one embodiment, wired interface may include but is not limited to Ethernet, fibre optics and twisted pair cables. In one embodiment, wireless interface may include but is not limited to laser communication, Infra-Red (IR) communication and Radio Frequency (RF) communication.

FIG. 2 illustrates internal architecture of the media device 100 in accordance with some embodiments of the present disclosure. The media device 100 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The media device 100 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, request data 205, interface data 206, packet data 207 and other data 208.

In one implementation, the request data 205 includes, but is not limited to, format of the multimedia data, size of the multimedia data and time frame of the multimedia data.

In one implementation, the interface data 206 may include, but is not limited to, number of network interfaces 101 available in the media device 100, type of network interfaces 101 and the one or more bandwidth parameters of the network interfaces 101. Here, the one or more bandwidth parameters may include, but is not limited to, bandwidth size, bandwidth speed, latency, throughput jitter and error rate.

In an embodiment, the packet data 207 may include, but is not limited to, number of data packets the multimedia data is divided into, time frame corresponding to each data packet and allocation information of the data packets to the one or more network interfaces 101.

In an embodiment, the data 204 in the memory 202 is processed by modules 209 of the media device 100. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 209 when configured with the functionality defined in the present disclosure will result in a novel hardware.

In one implementation, the modules 209 may include, for example, communication module 210, identification module 211, allocation module 212 and other modules 213. It will be appreciated that such aforementioned modules 209 may be represented as a single module or a combination of different modules.

In an embodiment, the communication module 210 receives a request from a user for streaming a multimedia data on the media device 100. Also, the communication module 210 receives the one or more packets from the media server 104 through the one or more network interfaces 101.

In an embodiment, the identification module 211 receives an indication from the communication module 210 regarding the request from the user. Then, the identification module 211 identifies the one or more network interfaces 101 available in the media device 100. In an embodiment, a network interface 101 may be present in the media device 100, but may not be available for streaming the multimedia data. In such scenario, the identification module 211 may not identify the network interface 101. The identification module 211 may generate a log for storing the identified one or more network interfaces 101.

The allocation module 212 receives the request data from the communication module 210 and the interface data 206 from the identification module 211. Further, the allocation module 212 determines the one or more bandwidth parameters of each of the one or more available network interfaces 101. Further, the allocation module 212 allocates one or more packets to each of the one or more network interfaces 101 based on the bandwidth parameters. The allocation information of the one or more packets to each of the one or more network interfaces 101 is stored as the packet data 207 by the allocation module 212. The allocation module 212 provides the packet data 207 to the communication module 210 for requesting the one or more packets over the allocated one or more network interfaces 101.

In an embodiment, the other modules 213 may include, but are not limited to, buffering module, media parser module and media player module. The media parser module provides information about quality of multimedia data, size of the multimedia data and duration of the multimedia data. In an embodiment, the buffering module receives the one or more packets from the allocated one or more network interfaces 101. Further, the one or more packets are collated by arranging header of the one or more packets in sequence to form the multimedia data. Then, the buffering module provides the multimedia data to the media player module for streaming.

Figure 3:
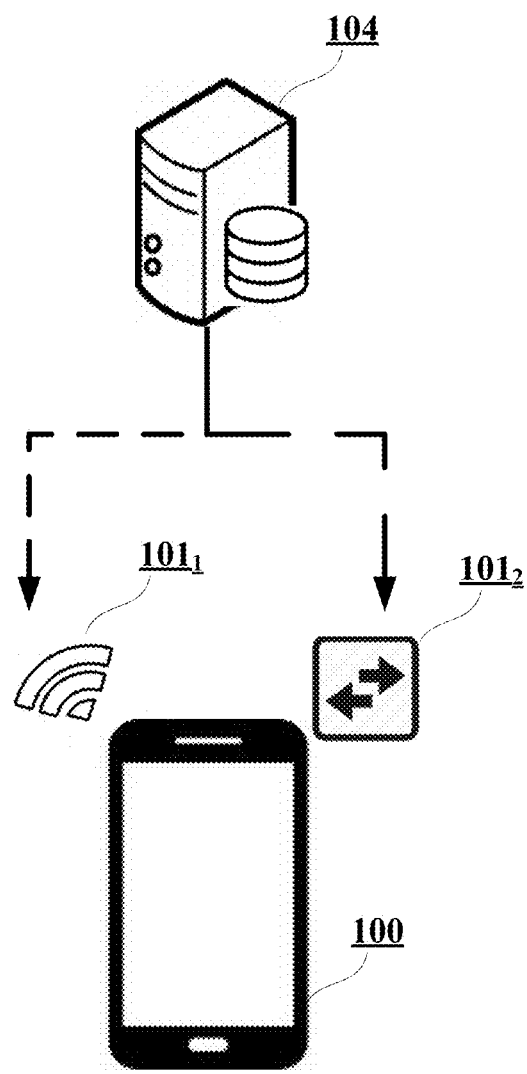
FIG. 3 shows a block diagram illustrating data flow for adaptive streaming of multimedia data, in accordance with some embodiments of the present disclosure.

FIG. 3 shows a block diagram illustrating data flow in accordance with some embodiments of the present disclosure. As shown in the FIG. 3, the multimedia data is received by the media device 100 from the media server 104. Here, the multimedia data is received as one or more packets from the media server 104. Further, the one or more packets are distributed among the one or more network interfaces 101 of the media device 100. The network interface $101_1$ represents a Wi-Fi network and the network interface $101_2$ represents a cellular network. Considering that the Wi-Fi network $101_1$ has more bandwidth speed compared to the cellular network $101_2$, line connecting the media server 104 to the Wi-Fi network $101_1$ illustrates that more number of the one or more packets are received through the Wi-Fi network $101_1$ and less number of packets are received through the cellular network $101_2$. Thus, the one or more packets are received through the one or more interfaces 101 for streaming the multimedia data.

Figure 4:
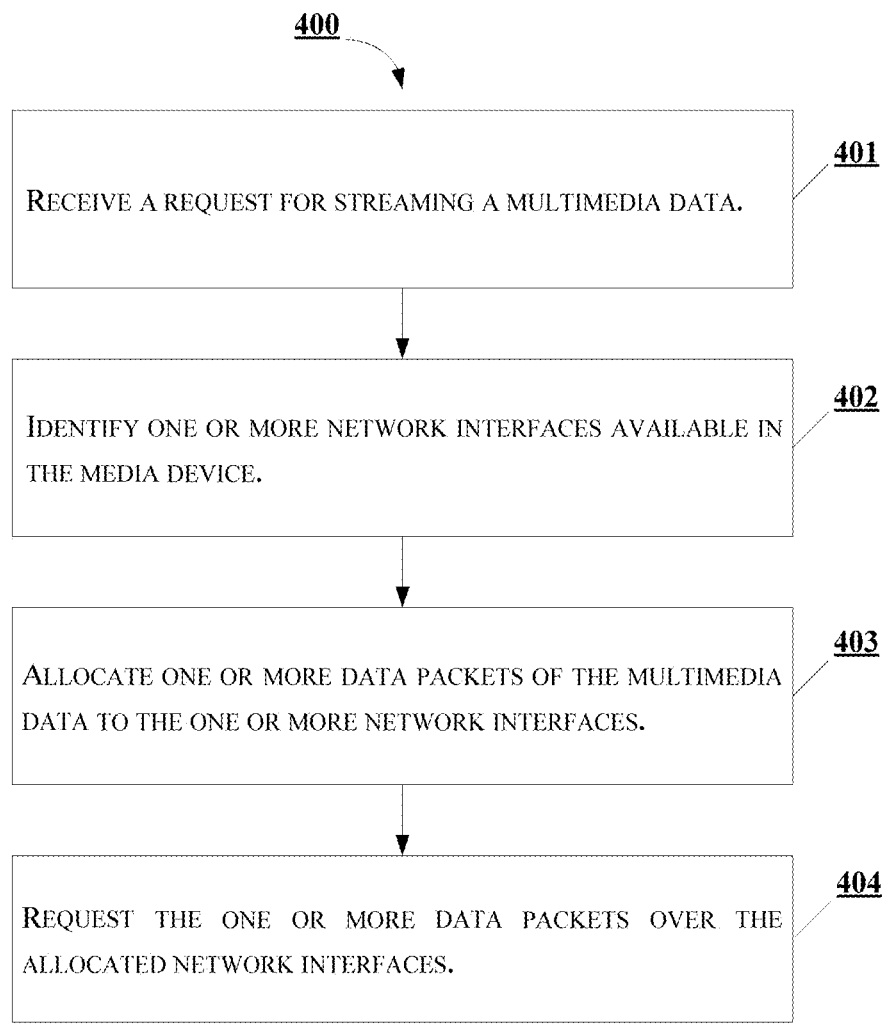
FIG. 4 shows an exemplary flow chart illustrating method steps for adaptive streaming of multimedia data, in accordance with some embodiments of the present disclosure.

FIG. 4 shows a flow chart illustrating a method for adaptive streaming of multimedia data, in accordance with some embodiments of the present disclosure.

As illustrated in FIG. 4, the method 400 may comprise one or more steps for adaptive streaming of multimedia data, in accordance with some embodiments of the present disclosure. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, the communication module 210 receives a request from a user for streaming the multimedia data. Here, the user may provide information about the multimedia data. The information may include, but is not limited to, name of the multimedia data, format of the multimedia data and quality of the multimedia data. The request is transmitted to the media server 104 and in return receives a response from the media server 104. The response may indicate, but is not limited to, an acknowledgment for the request made and packet data 207.

At step 402, the identification module 211 identifies the one or more network interfaces 101 available in the media device 100. The identification module 211 may store identified network interfaces information in a log. The log may include, but is not limited to, type of the one or more network interfaces 101, availability of the one or more network interfaces 101 and bandwidth size of the one or more network interfaces 101.

At step 403, the allocation module 212 allocates the one or more packets to the one or more network interfaces 101. The allocation module receives the packet data 207 from the communication module 210 and the interface data 206 from the identification module 211. The allocation module 212 determines the one or more bandwidth parameters of each of the one or more network interfaces 101. Particularly, the allocation module 212 calculates bandwidth speed of the one or more interfaces 101. In a non-limiting embodiment, the bandwidth speed is determined by receiving a sample data from the media server 104 on each of the one or more network interfaces 101. Further, time taken by the sample data to reach the media device 100 is determined. Then, the speed is calculated as shown below:

$$\text{Bandwidth speed} = \text{Amount of sample data/time taken to reach media device from media server} \quad (1)$$

In Equation 1 the amount of sample data is measured in bytes and the time is measured in seconds. Further, the bandwidth speed is measured in bits per second (bps). For illustration, let us consider 1 Mbyte of sample data is requested from the media server 104. Let the time taken by the sample data to reach the media device 100 be 3 s. The bandwidth speed is calculated as:

$$\text{Bandwidth speed} = (1 \text{ MB} * 8)/3 \text{ s}$$
$$= 2.666 \text{ Mega bits per second (Mbps)}$$

The bandwidth speed is calculated for each of the one or more interfaces 101 using Equation 1. For illustration, let us consider three network interfaces 101, namely first interface 101₁, second interface 101₂ and third interface 101₃. Let the bandwidth speed of the first interface 101₁, the second interface 101₂, and the third interface 101₃ be 0.8 Mbps, 1 Mbps and 3 Mbps respectively. Further, bandwidth speed required for receiving the multimedia data on the one or more network interface 101 is determined as given below:

$$\text{B/W speed of Interface } N \text{ for receiving multimedia data} = \text{Calculated speed of Interface } N^* (\text{Total speed required to receive multimedia data/Summation of calculated speed of Interface 1 to Interface } N) \quad (2)$$

The Equation 2 provides bandwidth speed of each of the one or more interfaces 101 for receiving the multimedia data. From the above illustration, let the total bandwidth speed required for receiving the multimedia data be 3.5 Mbps. The summation of calculated speed of the first interface 101₁, second interface 101₂, and the third interface 101₃ is 0.8 Mbps+1 Mbps+3 Mbps=4.8 Mbps. The bandwidth speed for the first interface 101₁, second interface 101₂, and the third interface 101₃ for receiving the multimedia data is calculated as follows:

First Interface=0.8 Mbps*(3.5 Mbps/4.8 Mbps)=0.59 Mbps

Second Interface=1 Mbps*(3.5 Mbps/4.8 Mbps)=0.73 Mbps

Third Interface=3 Mbps*(3.5 Mbps/4.8 Mbps)=2.18 Mbps

Figure 1B:
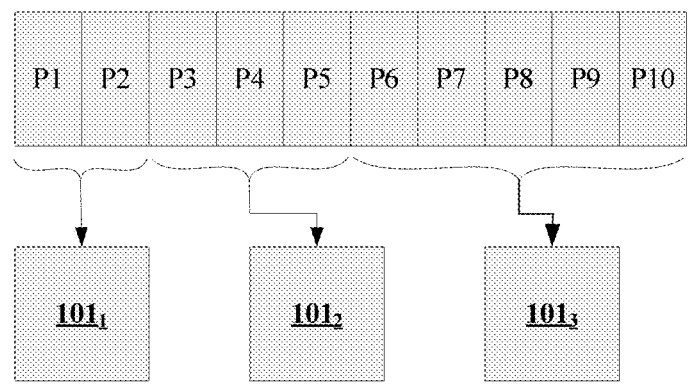
FIG. 1B shows an example of packet allocation by a media device for adaptive streaming of multimedia data, in accordance with some embodiments of the present disclosure.

From the above calculation, it evident that the third interface 101₃ has more bandwidth speed compared to first interface 101₁ and the second interface 101₂. Thus, more number of the one or more packets are allocated to the third interface 101₃. Likewise, the second interface 101₂ has more bandwidth speed compared to the first interface 101₁. Thus, the second interface 101₂ is allocated more number of the one or more packets than the number of packets allocated to the first interface 101₁. In an embodiment, the one or more packets may be allocated as shown in FIG. 1B. For example, packet P1 and packet P2 may be allocated to the first interface 101₁ Similarly, packet P3, packet P4 and packet P5 may be allocated to the second interface 101₂. Similarly, packet P6, packet P7, packet P8, packet P9 and packet P10 may be allocated to the third interface 101₃.

At step 404, the communication module 210 requests the one or more packets over the allocated one or more network interfaces 101. Further, the communication module 210 provides the one or more packets to the media buffer 102. The media buffer 102 collates the one or more packets by arranging the header of the one or more packets in a sequence to form the multimedia data. Then, the multimedia data is provided to the media player 103 for streaming.

In an embodiment, the multimedia data can be divided into the one or more packets based on data segments. For example, consider a multimedia data of 1 MB (1000 KB). 1 MB of the data can be divided into 3 packets. First packet may represent 600 KB of the multimedia data, a second packet may represent 300 KB from remaining 400 KB and a third packet may represent 100 KB.

In an embodiment, the one or more interfaces 101 are monitored by the media device 100 at predefined intervals of time.

Computer System

Figure 5:
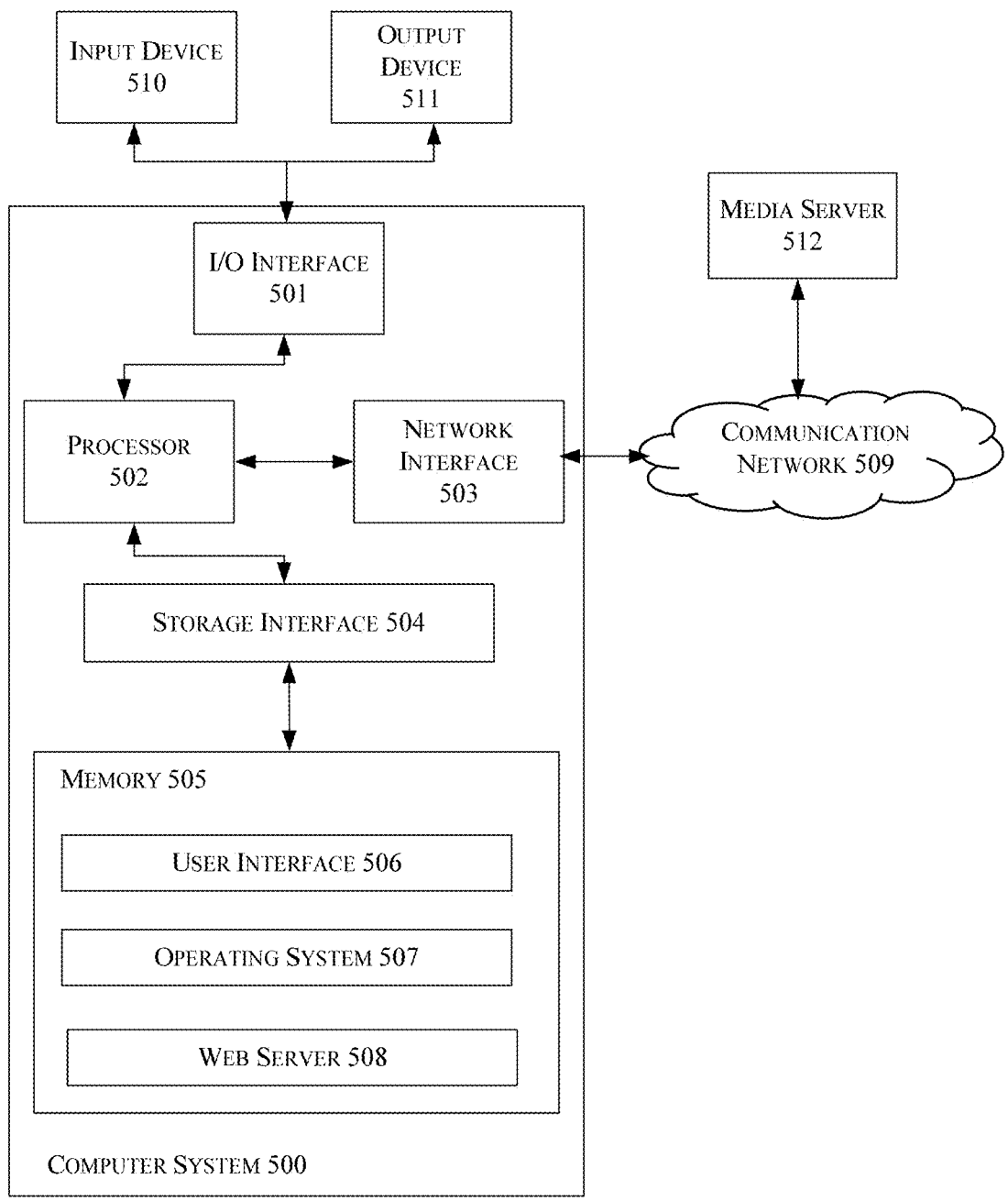
FIG. 5 shows a general-purpose computer system for adaptive streaming of multimedia data in accordance with some embodiments of the present disclosure.

FIG. 5 illustrates a block diagram of an exemplary computer system 500 for implementing embodiments consistent with the present disclosure. In an embodiment, the computer system 500 is used to implement the method for adaptive streaming of multimedia data. The computer system 500 may comprise a central processing unit ("CPU" or "processor") 402. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 503 and the communication network 509, the computer system 400 may communicate with the one or more service operators.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

In an embodiment, the media server 512 is connected to the communication network 509. The media server 512 transmits the multimedia data to the media device 100 for adaptive streaming.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure presents a method and a device for adaptive streaming of the multimedia data. The method employed in the present disclosure provides the multimedia data to the user with desired quality. Thus, the user need not compromise quality of the multimedia data streamed on the media device.

In an embodiment, the present disclosure discloses a method for receiving multimedia data over multiple network interfaces, thus reducing bandwidth congestion in one network bandwidth.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for adaptive streaming of multimedia data, the method comprising:
receiving, by a media device, a request for streaming multimedia data, wherein the multimedia data is divided into a plurality of data packets;
identifying, by the media device, a plurality of network interfaces (N) available in the media device;
allocating, by the media device, one or more data packets from the plurality of data packets, to the plurality of network interfaces (N), based on one or more bandwidth parameters of the plurality of network interfaces (N), wherein the one or more bandwidth parameters comprise a bandwidth (B/W) speed of the plurality of network interfaces (N), the bandwidth speed being determined based on sample data received on each of the plurality of network interfaces (N) and time taken by the sample data to reach the media device, wherein the bandwidth speed of the plurality of network interfaces (N) for receiving the multimedia data is calculated by:

$$B/W \text{ Speed of Interface } N = \text{Calculated Speed of Interface } N * (\text{Total Speed required to receive the multimedia data/Summation of Calculated Speed of Interface 1 to Interface } N),$$

wherein the Calculated Speed of Interface N=Amount of sample data received by Interface N/time taken for the sample data to reach the media device from media server;
requesting, by the media device, the allocated one or more data packets of the multimedia data over the plurality of network interfaces (N); and
collating, by the media device, the one or more data packets by arranging header of the one or more data packets in a sequence to form the multimedia data, for adaptively streaming the multimedia data on the media device.

2. The method of claim 1, wherein the plurality of data packets is divided based on time frame of the multimedia data.

3. The method of claim 1, wherein the one or more bandwidth parameters comprise at least one of the bandwidth speed, latency, throughput jitter or error rate.

4. The method of claim 1, wherein the one or more bandwidth parameters of the plurality of network interfaces (N) are monitored at predefined intervals of time.

5. The method of claim 1, further comprising reconstructing the requested one or more data packets for streaming on the media device.

6. The method of claim 1, wherein the one or more data packets are requested from the media server associated with the media device.

7. A media device for adaptive streaming of multimedia data, comprising:
a processor; and
a memory, communicatively coupled with the processor, which stores processor executable instructions, which, on execution causes the processor to:
receive a request for streaming multimedia data, wherein the multimedia data is divided into a plurality of data packets;
identify a plurality of network interfaces (N) available in the media device;
allocate one or more data packets from the plurality of data packets, to the plurality of network interfaces (N), based on one or more bandwidth parameters of the plurality of network interfaces (N), wherein the one or more bandwidth parameters comprise a bandwidth speed of the plurality of network interfaces (N), the bandwidth speed being determined based on sample data received on each of the plurality of network interfaces (N) and time taken by the sample data to reach the media device, wherein the bandwidth speed of the plurality of network interfaces (N) for receiving the multimedia data is calculated by:

$$B/W \text{ Speed of interface } N = \text{Calculated Speed of Interface } N * (\text{Total Speed required to receive the multimedia data/Summation of Calculated Speed of Interface 1 to Interface } N),$$

wherein the Calculated Speed of Interface N=Amount of sample data received by Interface N/time taken for the sample data to reach the media device from media server;
request the allocated one or more data packets of the multimedia data over the plurality of network interfaces (N); and
collate the one or more data packets by arranging header of the one or more data packets in a sequence to form the multimedia data, for adaptively streaming the multimedia data on the media device.

8. The media device of claim 7, wherein the plurality of data packets is divided based on time frame of the multimedia data.

9. The media device of claim 7, wherein the one or more bandwidth parameters comprise at least one of the bandwidth speed, latency, throughput jitter or error rate.

10. The media device of claim 7, wherein the one or more bandwidth parameters of the plurality of network interfaces (N) are monitored at predefined intervals of time.

11. The media device of claim 7, wherein the processor is: further configured to reconstruct the requested one or more data packets for streaming on the media device.

12. The media device of claim 7 wherein the one or more data packets are requested from the media server associated with the media device.

13. A non-transitory computer readable medium including instructions stored thereon that when processed by at least one processor cause a device to perform operations comprising:
receiving a request by a media device for streaming multimedia data, wherein the multimedia data is divided into a plurality of data packets;

identifying a plurality of network interfaces (N) available in the media device;

allocating one or more data packets from the plurality of data packets, to the plurality of network interfaces (N), based on one or more bandwidth parameters of the plurality of network interfaces (N), wherein the one or more bandwidth parameters comprise a bandwidth speed of the plurality of network interfaces (N), the bandwidth speed being determined based on sample data received on each of the plurality of network interfaces (N) and time taken by the sample data to reach the media device, wherein the bandwidth speed of the plurality of network interfaces (N) for receiving the multimedia data is calculated by:

> $B/W$ Speed of interface $N$=Calculated Speed of Interface $N$*(Total Speed required to receive the multimedia data/Summation of Calculated Speed of Interface 1 to Interface $N$), wherein the Calculated Speed of Interface N=Amount of sample data received by Interface N/time taken for the sample data to reach the media device from media server;

requesting the allocated one or more data packets of the multimedia data over the plurality of network interfaces (N); and collating the one or more data packets by arranging header of the one or more data packets in a sequence to form the multimedia data, for adaptively streaming the multimedia data on the media device.

14. The non-transitory computer readable medium of claim 13, wherein the plurality of data packets is divided based on time frame of the multimedia data.

15. The non-transitory computer readable medium of claim 13, wherein the one or more bandwidth parameters comprise at least one of the bandwidth speed, latency, throughput jitter or error rate.

16. The non-transitory computer readable medium of claim 13, wherein the one or more bandwidth parameters of the plurality of network interfaces (N) are monitored at predefined intervals of time.

17. The non-transitory computer readable medium of claim 13, wherein the at least one processor is further configured to reconstruct the requested one or more data packets for streaming on the media device.

18. The non-transitory computer readable medium of claim 13, wherein the one or more data packets are requested from the media server associated with the media device.

\* \* \* \* \*